United States Patent
Khatwa et al.

(10) Patent No.: US 10,140,876 B2
(45) Date of Patent: *Nov. 27, 2018

(54) SYSTEMS AND METHODS FOR ENHANCED AWARENESS OF OBSTACLE PROXIMITY DURING TAXI OPERATIONS

(71) Applicant: HONEYWELL INTERNATIONAL INC., Morris Plains, NJ (US)

(72) Inventors: Ratan Khatwa, Sammamish, WA (US); Pamela Mannon, Snohomish, WA (US)

(73) Assignee: Honeywell International Inc., Morris Plains, NJ (US)

( * ) Notice: Subject to any disclaimer, the term of this patent is extended or adjusted under 35 U.S.C. 154(b) by 443 days.

This patent is subject to a terminal disclaimer.

(21) Appl. No.: 14/961,524

(22) Filed: Dec. 7, 2015

(65) Prior Publication Data

US 2016/0133139 A1    May 12, 2016

Related U.S. Application Data

(63) Continuation of application No. 13/872,889, filed on Apr. 29, 2013, now Pat. No. 9,223,017.

(60) Provisional application No. 61/706,632, filed on Sep. 27, 2012.

(51) Int. Cl.
```
G08G 5/04      (2006.01)
G01S 13/93     (2006.01)
G08G 5/06      (2006.01)
B64D 43/00     (2006.01)
```

(52) U.S. Cl.
CPC ............ *G08G 5/04* (2013.01); *B64D 43/00* (2013.01); *G01S 13/93* (2013.01); *G01S 13/931* (2013.01); *G08G 5/065* (2013.01); *G01S 2013/9335* (2013.01); *G01S 2013/9339* (2013.01)

(58) Field of Classification Search
CPC ............ G08G 5/04; G08G 5/06; G08G 5/065; G08G 5/0021
See application file for complete search history.

(56) References Cited

U.S. PATENT DOCUMENTS 6,118,401 A * 9/2000 Tognazzini ............... G01S 7/04
                                                    342/29
7,379,014 B1 * 5/2008 Woodell .................. G01S 13/87
                                                    342/29

(Continued)

FOREIGN PATENT DOCUMENTS

JP          2011028579 A     2/2011

OTHER PUBLICATIONS

Response to European Examination Report dated Nov. 19, 2015, from counterpart European Application No. 13796644.6, filed Feb. 24, 2016, 18 pp.

(Continued)

*Primary Examiner* — Thomas G Black
*Assistant Examiner* — Peter D Nolan
(74) *Attorney, Agent, or Firm* — Shumaker & Sieffert, P.A.

(57) ABSTRACT

Systems and methods for predicting and displaying targets based on height in relation to the wing, wingtip or other elements of the aircraft, such as engine nacelles. The location of ground obstacles is based on radar returns (from sensors deployed on the ownship), aircraft surveillance data, and/or an airport moving map database.

20 Claims, 7 Drawing Sheets

(56) References Cited

U.S. PATENT DOCUMENTS

| | | | | |
|---|---|---|---|---|
| 7,783,427 B1* | 8/2010 | Woodell | | G01S 7/003 |
| | | | | 701/301 |
| 7,860,641 B2* | 12/2010 | Meunier | | G08G 5/065 |
| | | | | 340/945 |
| 7,903,023 B2 | 3/2011 | Cornie et al. | | |
| 7,932,838 B2* | 4/2011 | Hamza | | G08G 5/06 |
| | | | | 340/507 |
| 7,986,249 B2* | 7/2011 | Wilson | | G01C 23/00 |
| | | | | 340/951 |
| 8,077,081 B2 | 12/2011 | Bateman et al. | | |
| 8,249,762 B1* | 8/2012 | Flotte | | G01S 13/94 |
| | | | | 701/3 |
| 8,924,139 B2 | 12/2014 | Louis et al. | | |
| 8,958,942 B2 | 2/2015 | Kolcarek et al. | | |
| 8,970,423 B2 | 3/2015 | Kabrt et al. | | |
| 9,037,392 B2 | 5/2015 | Kirk et al. | | |
| 2003/0179215 A1* | 9/2003 | Coldefy | | G08G 5/0013 |
| | | | | 345/619 |
| 2006/0007021 A1* | 1/2006 | Konya | | G08G 5/0021 |
| | | | | 340/958 |
| 2006/0238376 A1* | 10/2006 | Khatwa | | G01C 23/00 |
| | | | | 340/970 |
| 2006/0238402 A1* | 10/2006 | Khatwa | | G01C 23/005 |
| | | | | 342/29 |
| 2007/0240056 A1* | 10/2007 | Pepitone | | G05D 1/0083 |
| | | | | 715/705 |
| 2008/0062011 A1* | 3/2008 | Butler | | G01S 3/783 |
| | | | | 340/961 |
| 2008/0109160 A1* | 5/2008 | Sacle | | G08G 5/0013 |
| | | | | 701/33.4 |
| 2008/0306691 A1* | 12/2008 | Louis | | G08G 5/0021 |
| | | | | 701/301 |
| 2009/0045982 A1* | 2/2009 | Caillaud | | G01C 21/00 |
| | | | | 340/972 |
| 2009/0174591 A1* | 7/2009 | Cornic | | G01S 13/44 |
| | | | | 342/29 |
| 2009/0219189 A1* | 9/2009 | Bateman | | G01S 7/06 |
| | | | | 342/30 |
| 2009/0265088 A1* | 10/2009 | Dias | | G01C 23/00 |
| | | | | 701/120 |
| 2010/0042312 A1* | 2/2010 | Meunier | | G01C 23/00 |
| | | | | 701/120 |
| 2010/0123599 A1* | 5/2010 | Hamza | | G08G 5/06 |
| | | | | 340/903 |
| 2010/0127895 A1* | 5/2010 | Wilson | | G01C 23/00 |
| | | | | 340/972 |
| 2010/0332123 A1* | 12/2010 | Filias | | G01C 23/00 |
| | | | | 701/467 |
| 2011/0267206 A1* | 11/2011 | Reynolds | | G08G 5/0013 |
| | | | | 340/963 |
| 2012/0130624 A1 | 5/2012 | Clark et al. | | |
| 2013/0096814 A1 | 4/2013 | Louis et al. | | |
| 2013/0321169 A1 | 12/2013 | Bateman et al. | | |
| 2013/0321176 A1 | 12/2013 | Vasek et al. | | |
| 2013/0321192 A1 | 12/2013 | Starr et al. | | |
| 2013/0321193 A1 | 12/2013 | Vasek et al. | | |
| 2013/0325312 A1 | 12/2013 | Khatwa et al. | | |
| 2014/0062756 A1 | 3/2014 | Lamkin et al. | | |
| 2014/0085124 A1 | 3/2014 | Dusik et al. | | |

OTHER PUBLICATIONS

International Preliminary Report on Patentability from counterpart International Patent Application No. PCT/US2013/043287, dated Dec. 11, 2014, 8 pp.

Extended Search Report from counterpart European Application No. 13796644.6-1812, dated Nov. 2, 2015, 8 pp.

Search Report and Written Opinion from counterpart International Application No. PCT/US2013/043287, dated Aug. 27, 2013, 11 pp.

Prosecution History from U.S. Appl. No. 13/872,889, dated Apr. 29, 2013 through Nov. 25, 2015, 59 pp.

Examination Report from counterpart European Application No. 13796644.6, dated Sep. 7, 2018, 4 pp.

* cited by examiner

SYSTEMS AND METHODS FOR ENHANCED AWARENESS OF OBSTACLE PROXIMITY DURING TAXI OPERATIONS

This application is a continuation of U.S. patent application Ser. No. 13/872,889 by Khatwa et al., filed Apr. 29, 2013 and entitled, "SYSTEMS AND METHODS FOR ENHANCED AWARENESS OF OBSTACLE PROXIMITY DURING TAXI OPERATIONS," which claims the benefit of U.S. Provisional Patent Application Ser. No. 61/706,632, filed Sep. 27, 2012, the entire contents of each of which are hereby incorporated by reference in their entireties. The entire content of U.S. Provisional Application Ser. No. 61/653,297, filed May 30, 2012, is also incorporated by reference herein.

BACKGROUND OF THE INVENTION

There currently exists an expensive safety problem of aircraft wingtips clipping obstacles (e.g., 2011 Paris Air Show, an A380 accident in which a wing hit a building; 2012 Chicago O'Hare accident in which a Boeing 747 cargo aircraft's wing clipped an Embraer 140's rudder). Some solutions have radar sensors placed at the wingtips and information about these potential obstacles is presented to the pilot on a human-machine interface (e.g., head-up, head-down, or head-mounted display). Having such information available improves crewmembers' awareness of obstacles, allowing them to better adjust the current aircraft speed and direction to the detected obstacles and to evaluate if a particular obstacle is a threat. However, providing information about only the lateral location of obstacles relative to an aircraft does not explicitly address whether its height of the wing, wingtips, or nacelle will clear the obstacles, based on height of the object.

SUMMARY OF THE INVENTION

The present invention provides systems and methods for predicting and displaying targets based on height in relation to the wing or other elements of the aircraft, such as engine nacelles. In addition, the systems and methods for depicting target threat based on lateral and/or vertical proximity of targets are included. The location of ground obstacles is based on radar returns (from sensors deployed on the ownship); aircraft surveillance data, such as automatic dependent surveillance-broadcast (ADS-B); and/or an airport moving map database (e.g., location of buildings, towers, etc., on the airport surface). The ADS-B data provides aircraft-type data and an onboard database provides a look-up table for aircraft and/or other vehicle geometry information. In addition, airport ground vehicles equipped with ADS-B are detectable.

BRIEF DESCRIPTION OF THE DRAWINGS

Preferred and alternative embodiments of the present invention are described in detail below with reference to the following drawings.

DETAILED DESCRIPTION OF THE INVENTION

Figure 1:
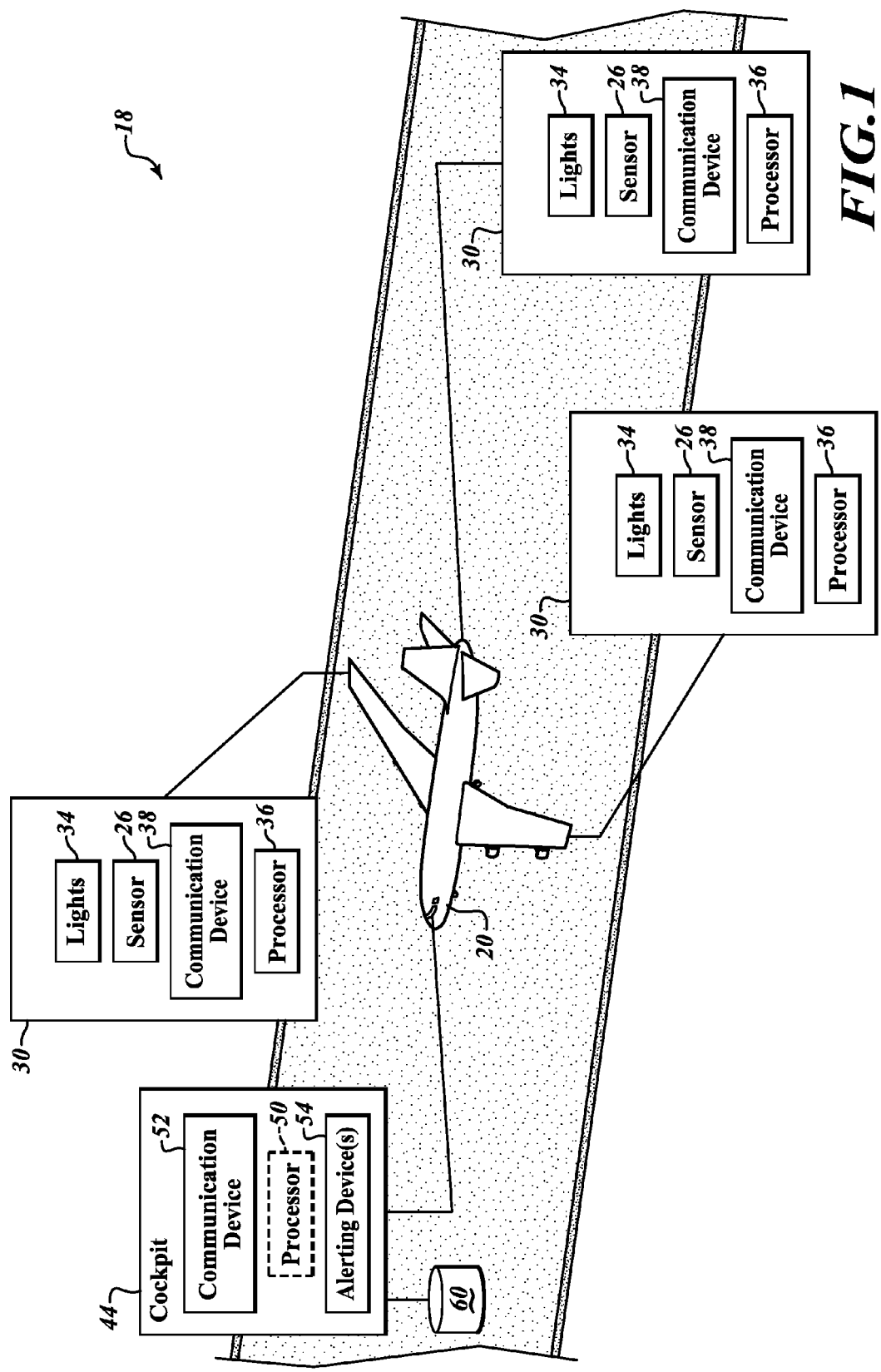
FIG. 1 is a diagram of an aircraft configured with an obstacle awareness system formed in accordance with an embodiment of the present invention.

FIG. 1 shows an exemplary airport surface collision-avoidance system (ASCAS) 18 that includes components on an aircraft 20 for providing enhanced awareness of proximate obstacles relative to ownship (e.g., aircraft) components (e.g., wingtip, nacelles). The aircraft 20 includes sensors (e.g., active sensor (e.g., radar)) and/or passive sensor (e.g., camera) 26 included within an obstacle detection module 30, for example an aircraft light module. These modules 30 also include other elements such as navigation/position lights 34, a processor 36, and a communication device 38. The sensors 26 are in communication via the communication device 38 (wired or wirelessly) to a cockpit user interface (UI) device 44.

The UI device 44 includes a processor 50 (optional), a communication device (wired or wireless) 52, and an alerting device(s) 54. The UI device 44 provides audio and/or visual cues (e.g., via headphones, PC tablets, etc.) based on sensor-derived and processed information.

Based on information from the sensors 26, the UI device 44 provides some or all of the following functions: detect and track intruders, evaluate and prioritize threats, and declare and determine actions. Once an alert associated with a detection has been produced, then execution of a collision-avoidance action (e.g., stop the aircraft, maneuver around intruder, etc.) is manually performed by a pilot or automatically by an automated system (e.g., autobrakes).

In one embodiment, processing of the sensor information is done by the processor 36 at the sensor level and/or by the processor 50 at the UI device 44.

In one embodiment, situational awareness is improved by integration with automatic dependent surveillance-broadcast/traffic information service-broadcast (ADS-B/TIS-B), airport/airline information on vehicles/aircraft/obstacles (e.g., through WiMax), and with synthetic vision system/enhanced vision system/combined vision system (SVS/EVS/CVS) received by the respective devices using the communication device 38.

In one embodiment, the present invention reduces false alarms by utilizing flight plan and taxi clearance information, and airport building/obstacle databases stored in memory 60 or received from a source via the communication devices 52. The stored airport building/obstacle databases include height information for any ground obstacle.

The sensors 26 integrated in the wing and tail modules 30 provide near-complete sensor coverage of the aircraft 20. Full coverage can be attained by placing sensors at various locations on the aircraft 20.

The pilot is alerted aurally, visually, and/or tactilely. For example, aural alerting is through existing installed equipment, such as the interphone or other warning electronics (e.g. Crew Alerting System) or possibly the Enhanced Ground Proximity Warning System (EGPWS) platform.

Figure 2:
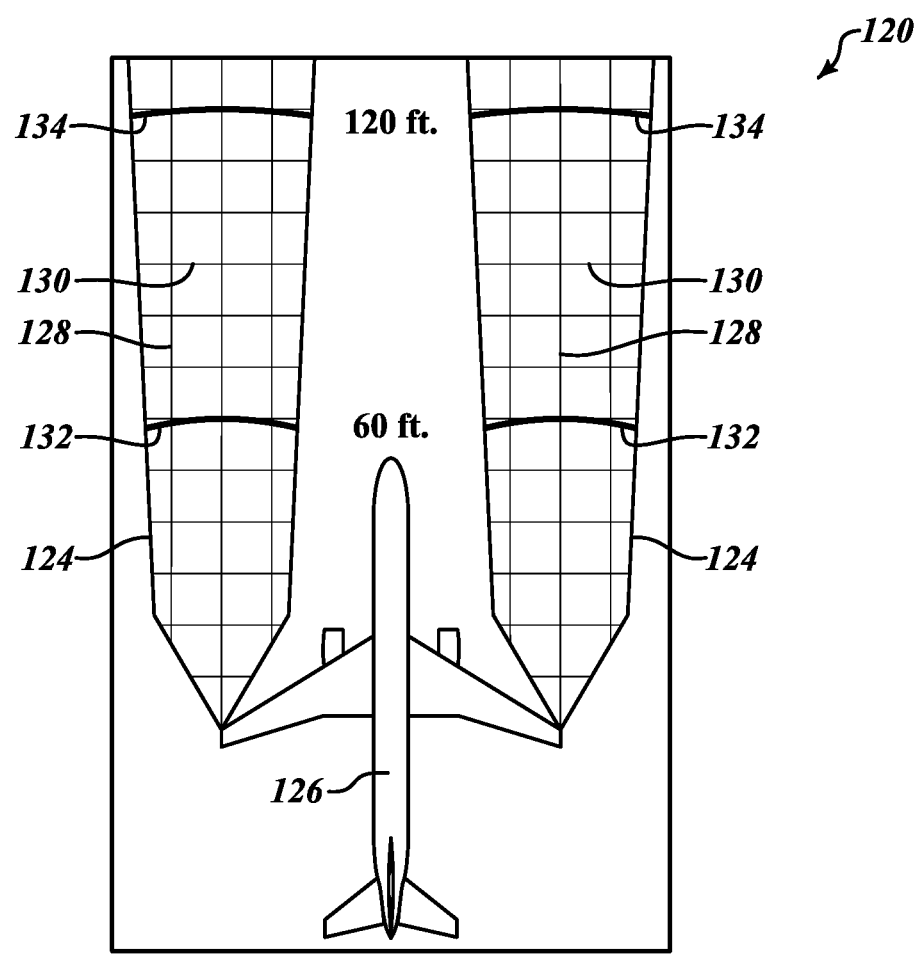
FIGS. 2 through 5 show exemplary graphical user interfaces of sensed obstacles relative to an ownship.

The present invention provides systems and methods for allowing a flight crew to visualize an object's distance from the host aircraft using two scalable range rings, which can be set to either feet or meters. FIG. 2 shows a top down image 120 presented by the alerting device(s) 54. The image 120 includes an ownship aircraft icon 126 located at the bottom of the image 120 with two radar beam coverage areas 124 that project forward from wingtips of the icon 126. Two range rings 132, 134 are shown on the display at fixed distances in front of the wing. The range rings 132, 134 are scalable, using either an interface on an electronic flight bag (EFB), or a flight deck display control panel, or a cursor control device (CCD) in the aircraft 20, when shown on a device such as a navigation display.

Gray (or other) colored gridlines 128, 130 are included in the areas 124. The gridlines 128, 130 add perspective and situational awareness at fixed intervals on the image 120. In one embodiment, each vertical and horizontal gridline 128, 130 represents 10 feet each, when units are in English feet, and 5 meters each, when units are in metric. Other increments may be used.

Figure 3:
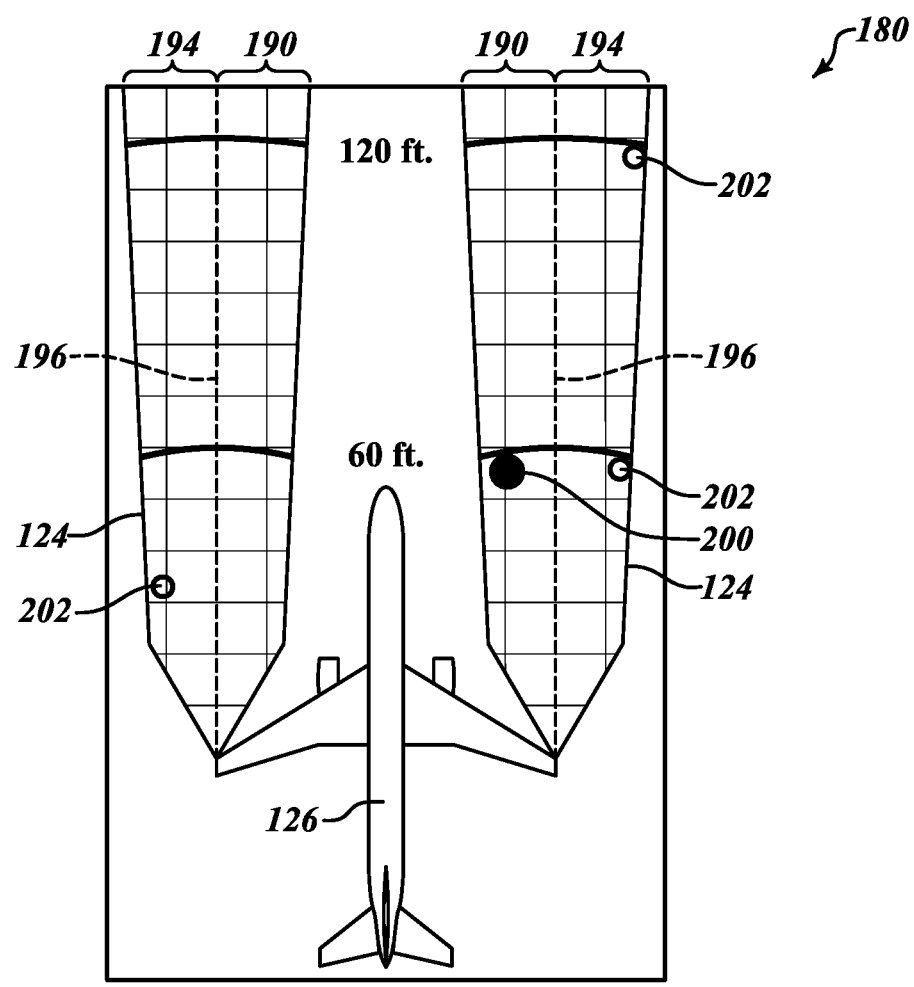

In one embodiment, as shown in FIG. 3, an image 180 generated by the processor 36 or 50 allows the flightcrew to visualize the lateral path of both wingtips of their aircraft, by integrating obstacle information on the image 180. Primary targets are those objects on the ground that are in a direct strike zone of the aircraft's structure, such as a wing, wingtip, or nacelle (for example, within a radar beam zone). Secondary targets are those objects on the ground that are outside the direct strike zone of an aircraft wing, wingtip, or nacelle but within a predetermined distance from the aircraft in both lateral and vertical dimensions (for example, within the radar beam's zone if radar is the primary sensor).

In the image 180, a primary strike zone 190 is identified as the zone from the wingtip inward toward the aircraft (i.e., the icon 126). A secondary strike zone 194 is a predetermined distance from the wingtip outward within the defined coverage area 124. Primary targets are those inside the primary strike zone 190 and secondary targets are those in the secondary strike zone 194. Separation between the zones 190, 194 is shown with a dashed line 196 (e.g., white or other color). In one embodiment, primary targets are shown as a large solid circle 200 (e.g., brown or other color) and secondary targets are shown as a smaller, hollow circle 202 (e.g., brown or other color). Other forms of display differentiation could also be used to identify the primary and secondary targets, such as texture (patterns). In one embodiment, a different symbolic shape is used to distinguish between the primary and secondary targets. The secondary targets represent targets that would not be threats if the intended trajectory of the host aircraft (vehicle) is maintained.

In one embodiment, the dashed line 196 does not appear on the display image 180. However, differentiation between primary and secondary zones is shown with a thicker white or gray line in the middle of the radar beam area 124 (i.e., visual coding is used to distinguish between primary and secondary zones 190, 194). Other visual coding techniques may be used.

Figure 4:
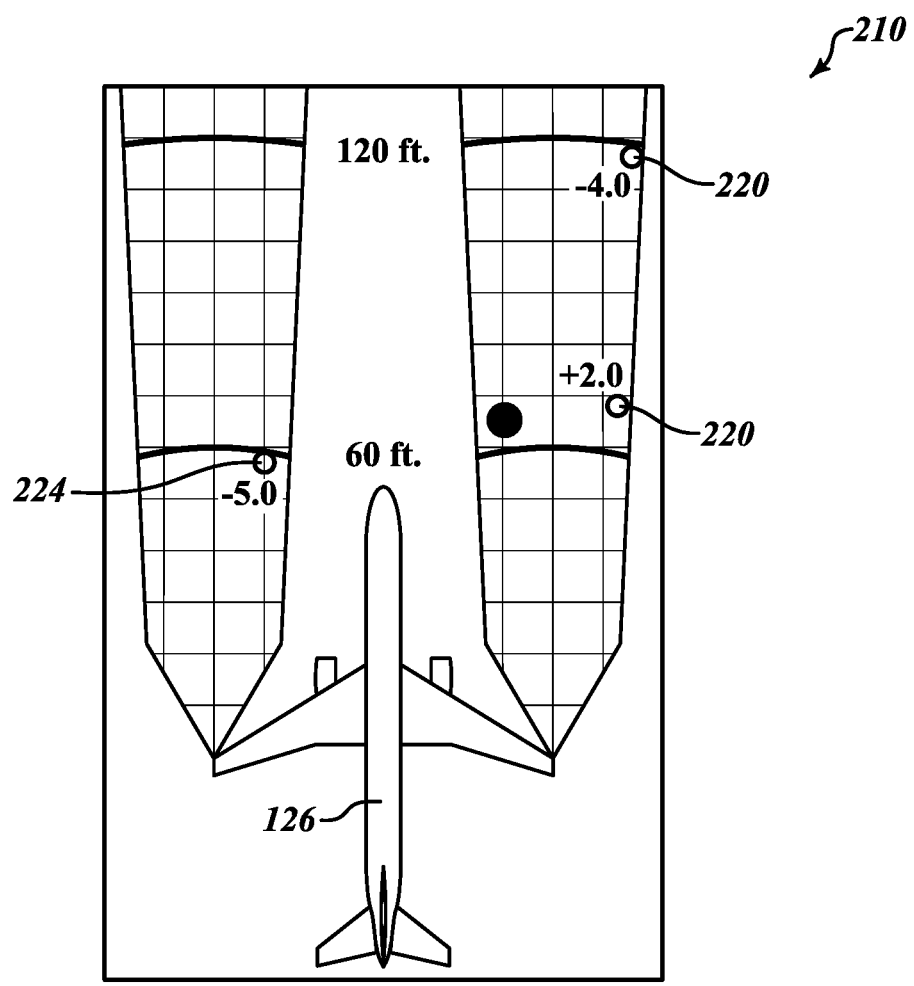

If information is available on the vertical extent of detected obstacles (targets) the processor 36 or 50 shows (in the image 180) those targets that are in the primary strike zone 190 but either above or below the host vehicle component (e.g., wing or nacelle area). The secondary targets represent targets that would not be threats if the intended trajectory of the host aircraft (vehicle) is maintained with secondary target icons 220, as shown in FIG. 4. In one embodiment, a clearance threshold is applied to obstacles in the primary strike zone 190. Those obstacles that are not within the clearance threshold of the aircraft's structure (e.g., 5 to 30 inches) are deemed to be secondary targets. These are depicted as the smaller, hollow circles (see target icon 224 in FIG. 4). In one embodiment, as shown in FIG. 4, a value of how far (vertically) the associated targets are from the host vehicle structure is identified on image 210 (+ means above, − means below).

Figure 5:
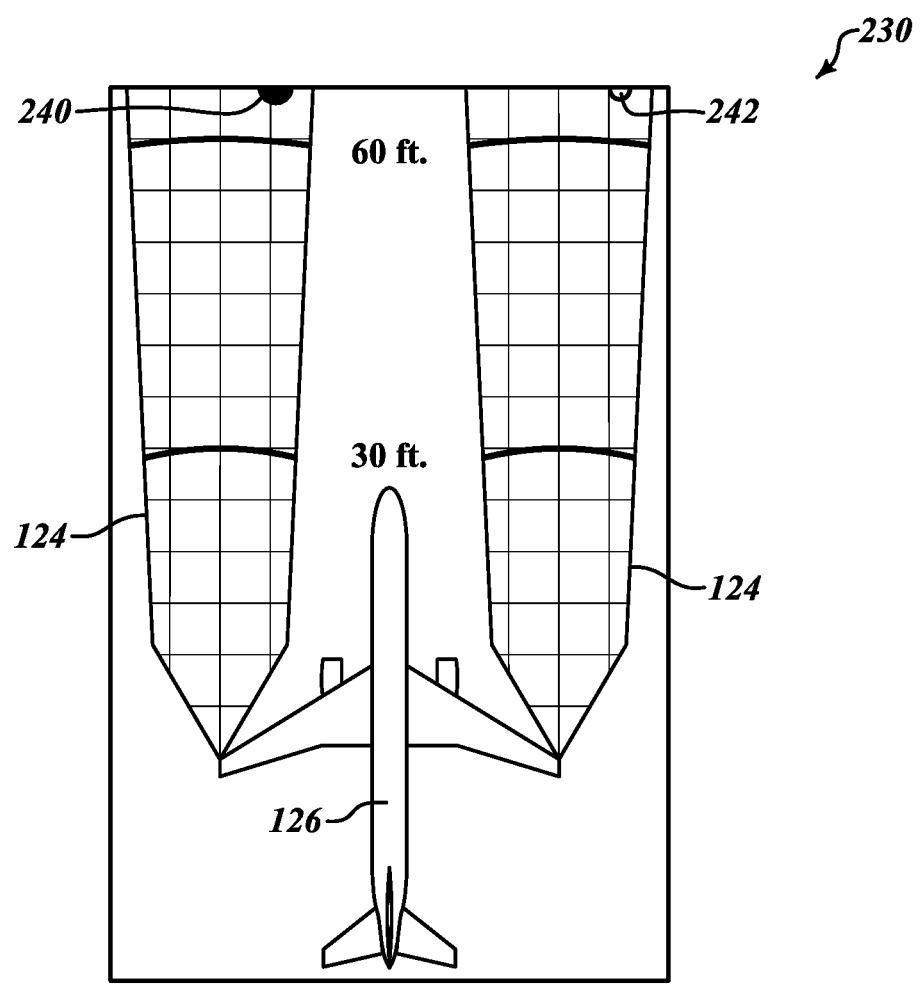

FIG. 5 shows a top down/moving map image 230 that shows target icons 240, 242 that are parked at the end of the displayed area 124 farthest from the aircraft icon 126 when the associated targets are off the scale of the areas 124. The target icon 240 indicates that there is an obstacle in the primary zone to the port side of the aircraft. The target icon 242 indicates that there is an obstacle in the secondary zone outside the right wingtip. The off-scale targets are shown as half-circle icons at the correct sensed bearing from the host aircraft.

If vertical information related to obstacles is available, an airport moving map display or vertical situation display (VSD) (e.g., displayed below the plan view display) incorporates obstacle information from an airport database, based on received target information.

Figure 6:
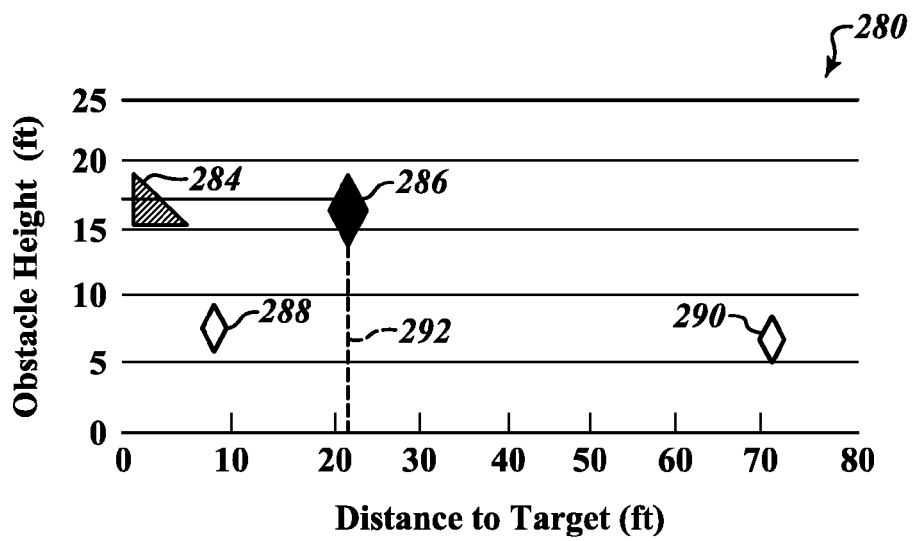
FIGS. 6 through 8 show exemplary vertical profile interfaces of sensed obstacles relative to an ownship.

As shown in FIG. 6, an ownship wing position (or other aircraft structure) is shown as a triangle icon 284, within a VSD image 280. Previously identified primary targets are shown as solid diamonds 286 (e.g., brown) and secondary targets are shown as hollow, smaller diamonds 288, 290 (e.g., brown).

In one embodiment, a vertical (y) scale in the VSD image 280 shows obstacle height in either meters or feet (set through either a menu or maintenance options user interface). The lateral distance (feet or meters) to the target is shown along the lateral (x) scale of the VSD image 280. The horizontal scale can be adjusted using a zoom knob on a cursor control device (CCD) or using a range set knob.

In one embodiment, a vertical line 292 is drawn from the primary target icon 286 to the lateral scale to show how far the associated object is from the wingtip (or other aircraft structure).

Figure 7:
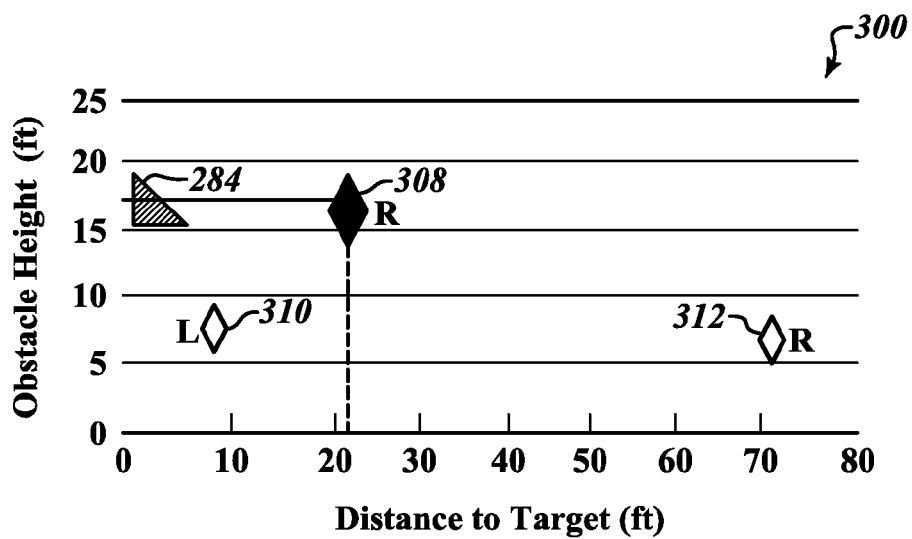

FIG. 7 shows a VSD image 300 that includes information that distinguishes whether targets are to the left or right of the aircraft's nose. In one embodiment, an "L" or an "R" is presented adjacent the target icons 308, 310, 312 to indicate left or right side location of the target, respectively.

In one embodiment, the flightcrew is presented with the option of selecting either a "LEFT WING" or "RIGHT WING" vertical profile depiction. The selection causes the processors 36, 50 to show icons for obstacles located on only the selected side of the host aircraft.

If vertical information related to obstacles is available (i.e., received via the communication device 52, or retrieved from local memory (60) based on identifying of the associated target), the distance in feet or meters of objects below (or above) the wing or nacelle is shown adjacent the respective icon, see VSD image 340 FIG. 8. A negative number indicates an obstacle below the host aircraft's part; a positive number is for those obstacles above the respective part.

Figure 8:
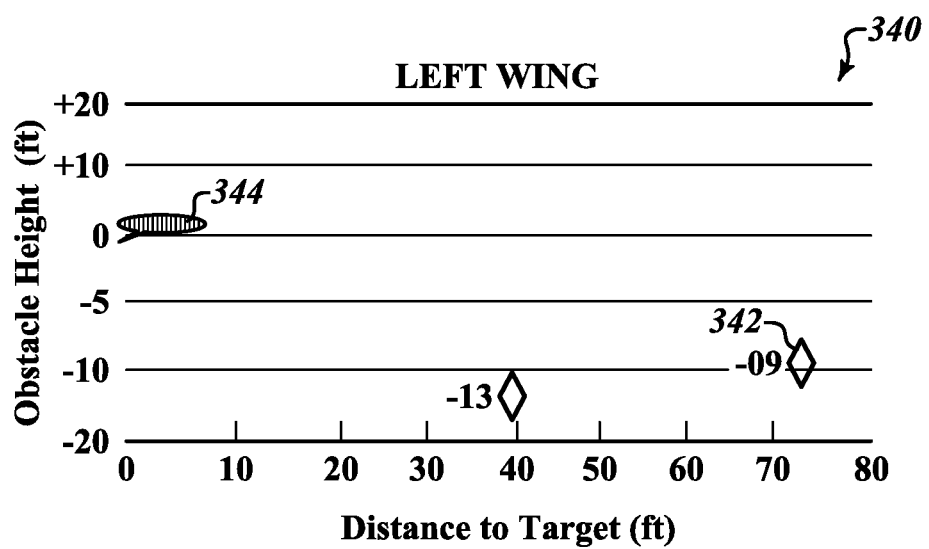

FIG. 8 also shows a "relative altitude" vertical display. The datum for the vertical scale is set to zero at the bottom of the ownship wing symbol 344 (or other reference position on the aircraft) and increase/decrease from the symbol 344. The target associated with a first icon 342 in the image 340 is 9 feet below the host aircraft structure indicated by a symbol 344 on the left side of the image 340.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A system comprising:
   one or more sensors configured to be positioned on an aircraft and generate sensed obstacle information;

a processor configured to:
 receive the sensed obstacle information from the one or more sensors,
 determine locations of a first obstacle and a second obstacle within a predefined field of view of the one or more sensors based on at least one of the sensed obstacle information, previously received surveillance data, or previously stored ground obstacle data,
 determine height information of the first obstacle;
 generate a numerical value based on the height information;
 generate an image comprising:
  an ownship icon indicating a location of the aircraft on a ground relative to the locations of the first obstacle and the second obstacle;
  a first icon associated with the first obstacle, the first obstacle being located within a first zone of the predefined field of view;
  a second icon associated with the second obstacle, the second obstacle being located within a second zone of the predefined field of view, wherein the first and second icons are visually different; and
  the numerical value; and
 a display device configured to present the generated image.

2. The system of claim 1, wherein the numerical value comprises a height of the first obstacle.

3. The system of claim 1, wherein the numerical value comprises a vertical distance of the first obstacle relative to a structure of the aircraft.

4. The system of claim 1, wherein the image comprises a vertical situation display comprising:
 a vertical scale that represents at least one of height above the ground or distance from a predefined structure of the aircraft; and
 a horizontal scale that represents distance from the predefined structure of the aircraft,
 wherein the ownship icon is presented adjacent the vertical scale at a location on the scale equal to a predefined height of the associated predefined structure of the aircraft.

5. The system of claim 4, wherein the image comprises a line that connects one of the first or second icons to the horizontal scale.

6. The system of claim 1, wherein the processor is further configured to determine whether the first obstacle is located to the left or right of the aircraft, wherein the image comprises an indicator presented adjacent the first icon that indicates the left or right determination of the first obstacle.

7. The system of claim 1, wherein the image comprises the numerical value adjacent the first icon.

8. The system of claim 1,
 wherein the image comprises a first sensed coverage area adjacent at least one feature associated with a left wing of the aircraft and a second sensed coverage area adjacent at least one feature associated with a right wing of the aircraft,
 wherein, when the processor determines that an obstacle is beyond a range of the first zone or the second zone but is within a lateral extent of the respective one of the first zone or the second zone, the processor generates the image to include at least a partial icon at a limit of a respective one of the first zone or the second zone.

9. The system of claim 1,
 wherein the processor is further configured to determine whether the first obstacle vertically clears a predefined vertical distance from a structure of the aircraft, and wherein the processor is configured to select a visual characteristic of the first icon based on whether the first obstacle is determined to vertically clear the structure of the aircraft.

10. The system of claim 1,
 wherein the second zone is associated with second areas outside the aircraft, the second areas being those where, if an obstacle was detected therein, the aircraft would avoid contact based on current heading of the aircraft,
 wherein the first zone is associated with a first area outside the aircraft, the first area being one where, if an obstacle was detected therein, the aircraft would be likely to collide with the obstacle based on current heading of the aircraft.

11. A method comprising:
 receiving, by a processor, sensed obstacle information from one or more sensors;
 determining, by the processor, locations of a first obstacle and a second obstacle within a predefined field of view of the one or more sensors based on at least one of the sensed obstacle information, previously received surveillance data, or previously stored ground obstacle data;
 determining, by the processor, height information of the first obstacle;
 generating, by the processor, a numerical value based on the height information;
 generating an image comprising:
  an ownship icon indicating a location of an aircraft on a ground relative to the locations of the first obstacle and the second obstacle;
  a first icon associated with the first obstacle, the first obstacle being located within a first zone of the predefined field of view;
  a second icon associated with the second obstacle, the second obstacle being located within a second zone of the predefined field of view, wherein the first and second icons are visually different; and
  the numerical value; and
 at a display device, presenting the generated image.

12. The method of claim 11, wherein the numerical value comprises a height of the first obstacle.

13. The method of claim 11, wherein the numerical value comprises a vertical distance of the first obstacle relative to a structure of the aircraft.

14. The method of claim 11, wherein the image comprises a vertical situation display comprising:
 a vertical scale that represents at least one of height above the ground or distance from a predefined structure of the aircraft; and
 a horizontal scale that represents distance from the predefined structure of the aircraft,
 wherein the ownship icon is presented adjacent the vertical scale at a location on the scale equal to a predefined height of the associated predefined structure of the aircraft.

15. The method of claim 14, wherein the generated image comprises a line that connects one of the first or second icons to the horizontal scale.

16. The method of claim 11, further comprising determining whether the first obstacle is located to the left or right of the aircraft, wherein the image comprises an indicator presented adjacent the first icon that indicates the left or right determination of the first obstacle.

17. The method of claim 11, wherein the image comprises the numerical value adjacent the first icon.

18. The method of claim 11, wherein the image comprises a first sensed coverage area adjacent at least one feature associated with a left wing of the aircraft and a second sensed coverage area adjacent at least one feature associated with a right wing of the aircraft, the method further comprising:
   determining a third obstacle is beyond a range of the first zone or the second zone but is within a lateral extent of the respective one of the first zone or the second zone, wherein the image further comprises a third icon associated with the third obstacle, the third icon being a partial icon presented at a limit of the respective one of the first zone or the second zone.

19. The method of claim 11, further comprising:
   determining, by the processor, whether the first obstacle vertically clears a predefined vertical distance from a structure of the aircraft; and
   selecting, by the processor, a visual characteristic of the first icon based on whether the first obstacle is determined to vertically clear the structure of the aircraft.

20. A system comprising:
   means for sensing one or more obstacles within a field of view;
   means for determining locations of a first obstacle and a second obstacle within a predefined field of view of the one or more sensors based on at least one of the sensed obstacle information, previously received surveillance data, or previously stored ground obstacle data;
   means for determining height information of the first obstacle;
   means for generating a numerical value based on the height information;
   means for generating an image comprising:
      an ownship icon indicating a location of an aircraft on a ground relative to the locations of the first obstacle and the second obstacle;
      a first icon associated with the first obstacle, the first obstacle being located within a first zone of the predefined field of view;
      a second icon associated with the second obstacle, the second obstacle being located within a second zone of the predefined field of view, wherein the first and second icons are visually different; and
      the numerical value; and
   means for presenting the generated image.

* * * * *